United States Patent
Han et al.

(10) Patent No.: US 10,839,491 B2
(45) Date of Patent: Nov. 17, 2020

(54) METHOD OF RECORDING AN IMAGE USING A PARTICLE MICROSCOPE AND PARTICLE MICROSCOPE

(71) Applicant: Carl Zeiss Microscopy GmbH, Jena (DE)

(72) Inventors: Luyang Han, Heidenheim (DE); Andreas Schmaunz, Oberkochen (DE); Martin Edelmann, Aalen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 166 days.

(21) Appl. No.: 16/035,887

(22) Filed: Jul. 16, 2018

(65) Prior Publication Data
US 2019/0019274 A1 Jan. 17, 2019

(30) Foreign Application Priority Data

Jul. 17, 2017 (DE) .......................... 10 2017 212 214

(51) Int. Cl.
*G06T 5/00* (2006.01)
*G06T 5/50* (2006.01)
(Continued)

(52) U.S. Cl.
CPC .............. *G06T 5/003* (2013.01); *G06T 5/50* (2013.01); *G06T 7/248* (2017.01); *G06T 7/30* (2017.01);
(Continued)

(58) Field of Classification Search
None
See application file for complete search history.

(56) References Cited

U.S. PATENT DOCUMENTS 7,034,296 B2    4/2006 Sato et al.
2003/0141451 A1*    7/2003 Sato ........................ G01N 23/22
                                                          250/310
(Continued)

FOREIGN PATENT DOCUMENTS

JP    2001-189782 A    7/2001
JP    2001-271167 A    10/2001
(Continued)

OTHER PUBLICATIONS

German Office Action, with English translation, for corresponding Appl No. 10 2017 212 014.5, dated Apr. 18, 2018.
(Continued)

*Primary Examiner* — Iman K Kholdebarin
(74) *Attorney, Agent, or Firm* — Fish & Richardson P.C.

(57) ABSTRACT

A method of recording an image using a particle microscope includes recording of plural images of an object. Each of the recorded images is associated with image data including intensity values associated with locations in a coordinate system of the recorded image. The method further includes: determining displacements between the coordinate systems of the image data of the recorded images; determining a bounding box of a resulting image based on the determined displacements; and calculating image data of the resulting image based on the intensity values of the image data of the recorded images associated with those locations which are located within the determined bounding box associated with the resulting image based on the determined displacements of the recorded images.

20 Claims, 3 Drawing Sheets

(51) Int. Cl.
*G06T 7/246* (2017.01)
*G06T 7/30* (2017.01)

(52) U.S. Cl.
CPC ............... *G06T 2207/10061* (2013.01); *G06T 2207/20201* (2013.01); *G06T 2207/20221* (2013.01)

(56) References Cited

U.S. PATENT DOCUMENTS

| | | | |
|---|---|---|---|
| 2006/0243905 A1* | 11/2006 | Yamaguchi | G01N 23/2251 250/307 |
| 2008/0221165 A1 | 9/2008 | Siebert et al. | |
| 2011/0249110 A1 | 10/2011 | Okai et al. | |
| 2014/0254874 A1* | 9/2014 | Kurz | G06K 9/4604 382/103 |
| 2015/0015678 A1* | 1/2015 | Kato | G06K 9/4604 348/50 |
| 2016/0019696 A1* | 1/2016 | Morita | H01J 37/28 348/80 |
| 2017/0278258 A1* | 9/2017 | Kurz | G06T 7/246 |

FOREIGN PATENT DOCUMENTS

| | | |
|---|---|---|
| JP | 2008-318305 A | 6/2010 |
| JP | 2012-229221 A | 11/2012 |
| JP | 2014-093429 A | 5/2014 |

OTHER PUBLICATIONS

Phase correlation (https://en.wikipedia.org/wiki/Phase_correlation).

Multivariate interpolation (https://en.wikipedia.org/wiki/Multivariate_interpolation).

Bailey et al., Sub-pixel estimation of local extrema, Image and vision computing NZ, Palmerston North, Nov. 2003.

Huang, T. S.; Hsu, Y. P.: Image Sequence Enhancement. In: Image Sequence Analysis. Edited by T.S. Huang. Berlin: Springer-Verlag, 1981, pp. 289-291.

German Office Action, with English translation, for corresponding Appl No. 10 2017 212 214.5, dated Apr. 18, 2018.

* cited by examiner

METHOD OF RECORDING AN IMAGE USING A PARTICLE MICROSCOPE AND PARTICLE MICROSCOPE

CROSS-REFERENCE TO RELATED APPLICATION

This application claims benefit under 35 U.S.C. § 119 to German Application No. 10 2017 212 214.5, filed Jul. 17, 2017. The content of this application is hereby incorporated by reference in its entirety.

FIELD

The present disclosure relates to methods of recording images using particle microscopes and to particle microscopes.

BACKGROUND

Particle microscopes typically include a stage for mounting an object to be imaged and a particle beam column mounted relative to the stage. The particle beam column generates one or more beams of charged particles directed onto the object. Signals generated by the particles incident on the object are detected such that detected signals can be associated with locations on the object where the signals were generated. A collection of values of detected signal intensities associated with a multitude of locations on the object form an image of the object which can be displayed on a screen, analyzed or stored for other purposes.

Since the detected signals are affected by noise, it is generally desirable to collect a sufficient amount of signals from an imaged region of the object in order to obtain an image having a desired resolution and quality. Therefore, the collection of the signals can take a considerable amount of time. It may happen in practice that the stage carrying the object moves relative to the beam column while the signals for one image are recorded. Such movement can be due to mechanical instabilities and thermal drifts or other reasons and results in that the association of the detected signals with locations on the object is not sufficiently well defined and a resulting image gets blurred. Moreover, the charged particles incident on the object and charged particles generated by the incident particles and leaving the object and possibly forming the detected signals may generate surface charges on the object. The amount of the generated surface charges depends on material properties of the object and may vary from location to location. Therefore, surface charges on the object may produce artefacts in the resulting image.

According to certain conventional methods, plural images of the object are subsequently recorded, wherein each of the recorded images has a lower image quality than a resulting image calculated from a superposition of the recorded images. In such methods, positional drifts between the stage and the beam column occurring during the recording of an individual image are neglected while drifts of the stage relative to the beam column occurring between the recordings of subsequent images are not neglected and are taken into account when the individual recorded images are combined to form the resulting image. For this purpose, the displacements between the recorded images can be determined by correlating the images relative to each other, i.e., by image analysis.

Thus, the combining of plural low-quality images to form a high-quality image may reduce a blurring of the high-quality image which might otherwise occur if drifts affected the recording of a single high-quality image.

Moreover, it has been found that imaging artefacts due to surface charges can be reduced in such methods. Such methods in particular allow for performing charge neutralization steps between the recordings of subsequent images.

According to a conventional method, a sequence of plural images are recorded and combined to form a resulting image taking displacements between the individual recorded images into account. Herein, the first recorded image in the sequence determines the image frame or bounding box of the resulting image and intensity values of the second and subsequent recorded images associated with locations within this image frame are added to the resulting image. Each adding of intensity values to the resulting image improves the signal-to-noise ratio and, thus, the quality of the resulting image.

SUMMARY

It has been found that this conventional method produces, in certain situations, images having a quality which could still be improved.

Embodiments of the present disclosure provide methods of recording images using particle microscopes, and particle microscopes providing an improved image quality of the resulting images.

According to embodiments, the method of recording an image using the particle microscope includes recording plural images of an object using the particle microscope, wherein each of the recorded images is associated with image data, wherein the image data include a plurality of intensity values associated with locations in a coordinate system of the recorded image.

For example, the locations associated with the intensity values can be arranged in a regular rectangular array. In such situation, the set of locations are referred to as a pixel array in the art, and the intensity values are the pixel values or grey levels of the pixels. However, the embodiments of the method are not limited to such arrangement of the locations associated with intensity values. Other arrangements, such as arrangements of locations in a regular hexagonal array or irregularly or even randomly distributed locations are encompassed by the embodiments.

The intensity values associated with the locations are determined from the recorded images associated with locations on the sample based on a correspondence between locations on the sample and locations in the coordinate system of the recorded image.

The recorded image may have an associated bounding box defined in the coordinate system of the recorded image such that the locations associated with the intensity values are located within the bounding box. In the example of the pixel array, the bounding box is commonly referred to as the image frame which is the rectangle surrounding the array of pixels. In other examples, the bounding box can be an irregular polygon surrounding the locations. According to a particular example, the bounding box can be defined as the convex hull of the locations associated with the intensity values.

According to some embodiments, the method includes determining displacements between the coordinate systems of the image data. For example, the displacements may be determined by correlating the image data of the recorded images.

According to some embodiments, a bounding box of a resulting image is determined based on the determined displacements between the coordinate systems of the image data of the recorded images. The inventor has found that the conventional method illustrated above in which the image frame of the first recorded image in a sequence determines the image frame of the resulting image has disadvantages in situations in which, for example, movements between the stage and the particle beam column occur such that the second and subsequent images are, for example, displaced to the right of the first image. In such situation, a region close to the left margin of the resulting image contains intensity values originating only from the first recorded image, resulting in a low signal-to-noise ratio of the resulting image in this region. Therefore, it can be advantageous to determine the bounding box of the resulting image based on the determined displacements. In the above-mentioned example, where the displacements occurred to the right of the first image, the bounding box of the resulting image can be also displaced to the right of the first image such that also subsequent images contribute to the image data of the resulting image associated with locations within the region close to the left margin of the resulting image such that particularly low signal-to-noise ratios are avoided in the resulting image.

According to some embodiments, the bounding box of the resulting image has a size which is equal to or greater than a smallest size of the bounding boxes of the recorded images. In this context, a first bounding box can be defined to be greater than a second bounding box if the second bounding box fits within the first bounding box, and the bounding boxes have equal size if they can be arranged to coincide. For example, if the recorded images all have a same size of, for example, 1024×1024 pixels, the resulting image will have a same size as the recorded images, i.e. 1024×1024 in the example, or it can be greater.

According to some embodiments, the method includes applying a coordinate transformation from the coordinate system of the recorded image to the coordinate system of the resulting image to elements of the recorded image. The coordinate transformation can be determined based on the determined displacements between the coordinate systems of the image data of the recorded images. The elements to which the coordinate transformation can be applied are elements which are associated with locations in the coordinate system of a recorded image. In particular, the locations of the intensity values of a recorded image are such elements which can be transformed to locations associated with the resulting image using the coordinate transformation. Further, the elements determining the bounding box of the recorded image are such elements which can be transformed to locations associated with the resulting image using the coordinate transformation. For example, the lines forming a polygon defining the bounding box of the recorded image can be transformed to the resulting image using this coordinate transformation.

According to some embodiments, the bounding box of the resulting image has a size which is greater than an intersection of the bounding boxes of all recorded images. In this context, the intersection of the bounding boxes of all recorded images can be the intersection of the bounding boxes of all recorded images after a corresponding coordinate transformation has been applied to each of the bounding boxes of the recorded images. The intersection of the bounding boxes of all recorded images has a size which is smaller than the size of the smallest bounding boxes of the recorded images, as long as non-zero drifts exist between subsequent recorded images.

According to some embodiments, the image data of the resulting image is calculated from the image data of the recorded images taking the determined displacements into account. According to particular embodiments herein, the calculating of the image data of the resulting image is based on the intensity values of the image data of the recorded images associated with those locations that are located within the bounding box associated with the resulting image and determined based on the determined displacements of the recorded images.

According to some embodiments, the calculating of the image data of the resulting image includes selecting intensity values from the image data of each of the recorded images, wherein the selected intensity values are associated with locations in the recorded images which are located, after applying a coordinate transformation from the coordinate system of the recorded image to the coordinate system of the resulting image, within the bounding box of the resulting image.

According to exemplary embodiments herein, intensity values of the recorded images which have not been selected will not contribute to the calculating of the image data of the resulting image.

According to other exemplary embodiments herein, the method further includes selecting of all image data of the recorded images which are located within the bounding box of the resulting image.

According to exemplary embodiments, the bounding box of the resulting image is determined such that a weighted sum of the determined displacements of the coordinate systems of the image data of the recorded images relative to the coordinate system of the image data of the resulting image is less than or equal to a predetermined amount.

According to some examples, all weights in this weighted sum of the determined displacements are equal. In such situation, the position of the bounding box of the resulting image relative to the recorded images can be regarded as the center of gravity of the positions of the recorded image. It is believed that this determination of the bounding box of the resulting image has an advantage in that regions in the resulting image where the signal to noise ratio is particularly low are effectively avoided.

According to other examples, the rates in the weighted sum of the determined displacements are not equal. For example, recorded images having higher displacements relative to their previous or next recorded images can be given a lower weight in the weighted sum based on the notion that the image quality of recorded images having higher displacements relative to their previous or subsequent recorded images can be deteriorated due to drifts.

According to exemplary embodiments, the calculating of the intensity value associated with a given location in the coordinate system of the resulting image includes calculating a weighted sum of intensity values of the recorded images located, after applying coordinate transformations from the coordinate systems of the recorded images to the coordinate system of the resulting image, at a distance from the given location which is smaller than or equal to a threshold distance.

According to particular examples herein, the weights in this weighted sum can be equal. This can be advantageous in exemplary situations, in which the image locations are arranged as a pixel array and the displacements between the recorded images and the resulting image are calculated as integer multiples of displacements between adjacent pixels.

According to other exemplary embodiments herein, the weights in this weighted sum depend on the distance between the given location in the coordinate system of the resulting image and the location associated with the intensity value after applying the coordinate transformation. This can be advantageous in exemplary situations in which displacements between pixel arrays are calculated as non-integer multiples of pixel spacings or in exemplary situations in which the locations associated with intensity values of the recorded images, or of the resulting image, have irregular arrangements. It can be advantageous in such situations to give intensity values associated with larger distances a lower weight.

According to other embodiments, weights of the intensity values in the weighted sum of the intensity values of the recorded images depend on displacements of the coordinate systems of the image data of the recorded images relative to the coordinate system of the image data of the resulting image.

According to some embodiments, the method further includes generating an image data file based on the image data of the resulting image and outputting the generated image data file.

The image data file has a defined file format, such as JPEG, BMP, PNG or other customary formats. According to further exemplary embodiments, a representation of the image data of the resulting image is displayed on a screen such that a user can perceive the image with his or her eyes.

According to exemplary embodiments of the disclosure, a particle microscope includes a stage configured to mount an object to be imaged, a particle beam column mounted relative to the stage and configured to record images of the object mounted on the stage, wherein the particle microscope is configured to perform the methods illustrated above.

According to further exemplary embodiments, a particle microscope includes a computer configured to determine displacements between coordinate systems of image data of recorded images by correlating the image data of the recorded images; to determine a bounding box of the resulting image based on the determined displacements, wherein the bounding box has a size which is equal to or greater than a smallest size of the bounding boxes of the recorded images; and to calculate image data of the resulting image based on the intensity values of the image data of the recorded images associated with those locations which are located within the determined bounding box associated with the resulting image based on the determined displacements of the recorded images.

BRIEF DESCRIPTION OF THE DRAWINGS

Embodiments of the disclosure are explained in more detail below with reference to the drawings, in which.

DETAILED DESCRIPTION OF EXEMPLARY EMBODIMENTS

Figure 1:
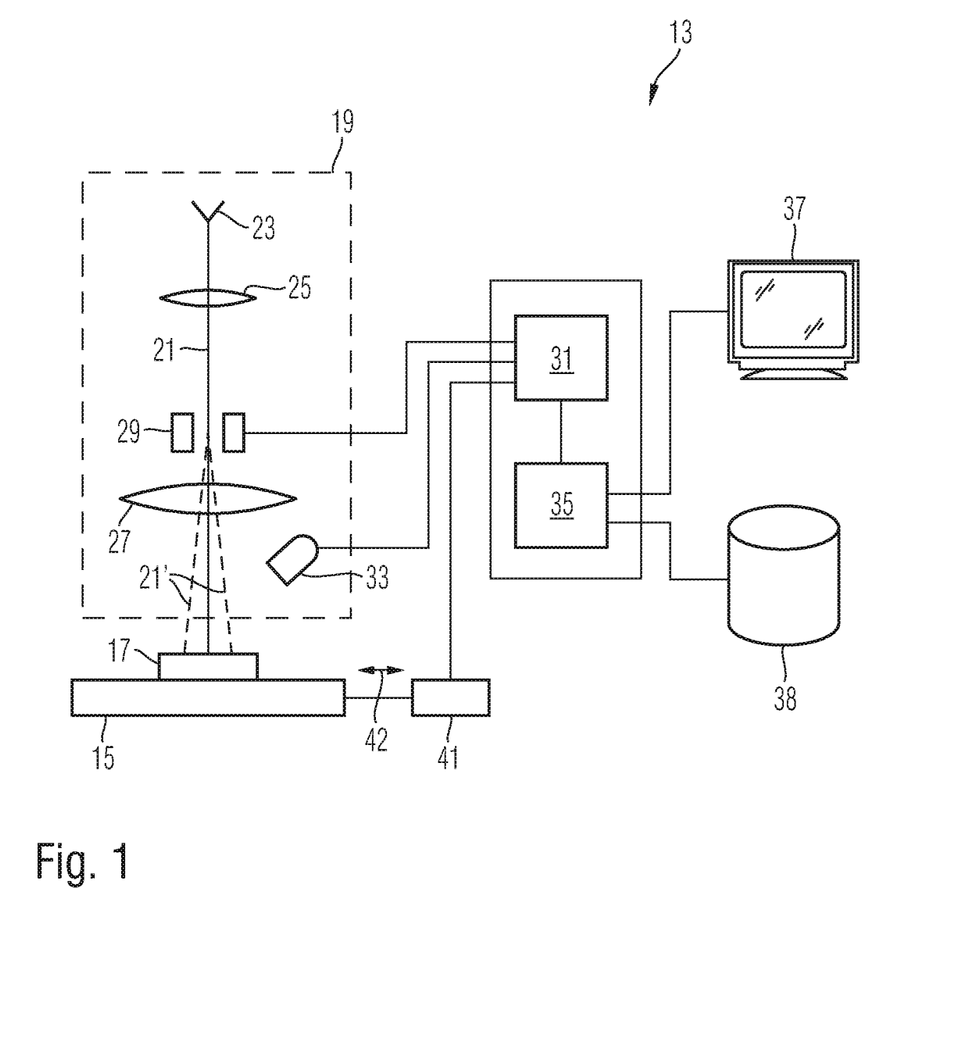
FIG. 1 shows a schematic illustration of an embodiment of a particle microscope.

FIG. 1 schematically illustrates a particle microscope 13. The particle microscope includes a stage 15 configured to hold an object 17 to be imaged. The stage 15 is mounted relative to a particle beam column 19 which is configured to generate a particle beam 21 directed onto the object 17. The particle beam 21 is emitted from a particle source 23, collimated by a condenser lens 25 and focused by an objective lens 27 to form a small beam spot on the surface of the object 17. The particle beam column 19 further includes a deflector 29 configured to deflect the beam such that it is selectively incident on arbitrary positions within an object field on the surface of the object 17. Broken lines 21' in FIG. 1 show the deflected beam 29 in two different deflected positions. The deflector 29 is controlled by a controller 31. The particle beam column 19 further includes a detector 33 configured to detect signals generated by the particles of beam 21 incident on the object. Output signals of the detector 33 are inputted to the controller 31.

The particle beam 21 can be a beam of charged particles. For example, the particle source 23 can be an electron source such that the beam 21 is an electron beam. According to other examples, the particle source 23 is an ion source such that the particle beam 21 is a beam of ions, such as, for example, Helium (He) or Gallium (Ga). The signals detected by detector 33 can be photons or charged particles which are caused to emerge from the object 17 by particles of the beam 21 incident on the object 17. For example, the signals detected by the detector 33 are secondary electrons or backscattered electrons.

The particle microscope 13 is configured to record images of the object 17 by directing, under the control of the controller 31, the particle beam 21 to a plurality of selected locations on the surface of the object 17. For each selected location, the controller 31 records values of intensity signals received from the detector 33. The controller 31 maintains an association between the intensity values received from the detector 33 and the location to which the beam 21 was directed while the respective intensity values were received. The collection of data representing the received intensity values and the associated locations represent an image of the object 17. These data can be transferred from the controller 31 to a computer 35 which may further process the data representing images, may display the images on a screen 37 or may store the data as image data files having a defined file format useful for storing images, such as JPEG, BMP, PNG or other in a storage medium 38.

The locations on the surface of the object which are associated with the recorded intensity values can be represented in various ways. For example, these locations can be represented as deflection angles of the particle beam 21 produced by the deflector 29. However, the locations can also be encoded in the image data by values representing electric currents for energizing the deflector in order to generate certain deflection angles. According to other examples, the locations can be represented as values of distances in meters measured in a coordinate system on the surface of the object 17.

The particle microscope 13 further includes an actuator 41 controlled by the controller 31 and configured to displace the stage 15 relative to the particle beam column 19 as indicated by an arrow 42 in FIG. 1.

Figure 2:
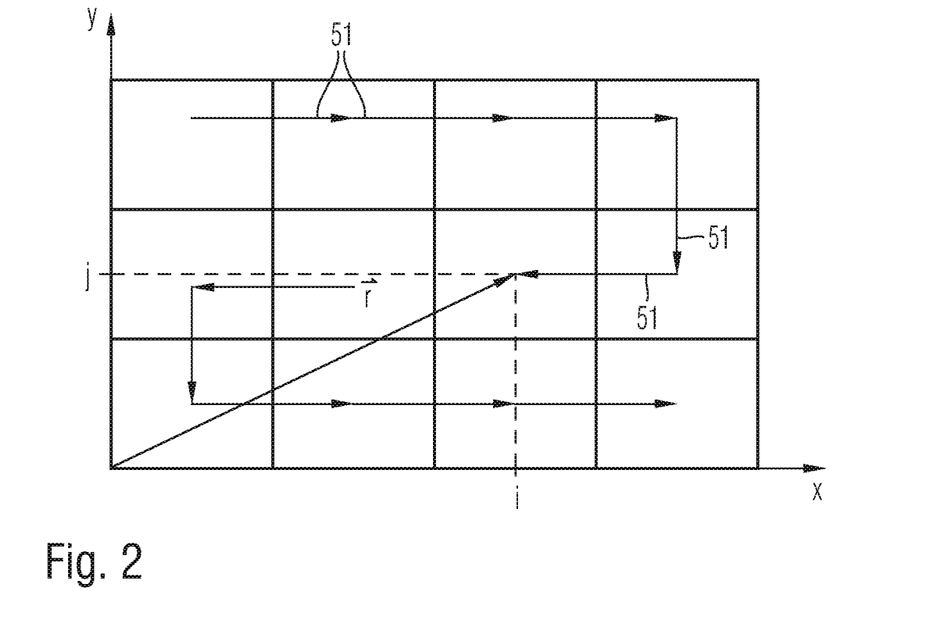
FIG. 2 is a schematic illustration of image data associated with an image recorded with the particle microscope shown in FIG. 1.

FIG. 2 is a schematic representation of image data associated with an image recorded by the particle microscope 13. It is assumed that the image is generated by directing the beam to a sequence of locations represented by arrows 51 in FIG. 2. At each of these locations, the beam remains for a certain time, which is also referred to as the dwell time, and signals are recorded with the detector 33 during this time. These collected signals represent intensity values of the recorded image and are associated with the locations on the object 17. In the example shown in FIG. 2, these locations are arranged in a regular rectangular pattern forming a 3×4 matrix. Such arrangement is also called a pixel array. The intensity values associated with each member of the array are referred to as the pixel values. In practice, if a regular rectangular array is used as the arrangement of the image locations, a higher number of pixels is used such that an image includes, for example, 840×760 pixels or 1024×1024 pixels or 2048×2048 pixels or others. Moreover, it is not required that the arrangement of locations is a regular rectangular arrangement, and the arrangement can be an irregular arrangement.

The pixel locations are associated with locations on the surface of the object as illustrated above. Therefore, the locations can be represented in a coordinate system which can be selected relative to the object surface. A suitable coordinate system can also be represented on the paper surface as shown in FIG. 2 where coordinate axis x and y are aligned with the arrangement directions of the pixels. In the illustrated example, the coordinates of the locations are identified by integer values i and j. A given location $\vec{r}$ can be represented as $\vec{r}=(i,j)^T$.

Figure 3:
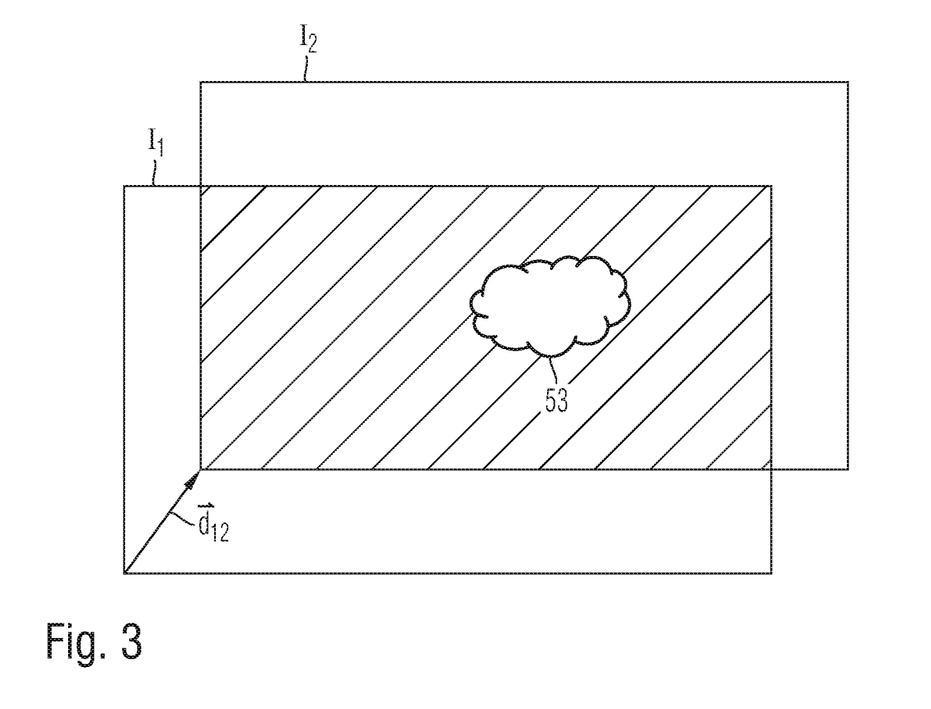
FIG. 3 is a schematic illustration illustrating a displacement between two images recorded with the particle microscope shown in FIG. 1.

FIG. 3 is a schematic illustration showing a first image $I_1$ and a second image $I_2$ which have been subsequently recorded of essentially the same region on the object surface. This region of the object surface is the same in that the actuator 41 has not been operated for displacing the stage 15 relative to the particle beam column 19 between the recording of the first and second images $I_1$ and $I_2$. But still, a certain displacement represented by an arrow $\vec{d}_{12}$ in FIG. 3 has occurred. This displacement may have occurred due to mechanical drifts between the stage 15 and the particle beam column 19. The displacement $\vec{d}_{12}$ occurring between the two subsequent images $I_1$ and $I_2$ is not directly measured by a measurement tool, such as an interferometer, integrated in the stage 15 in the illustrated example. However, the displacement $\vec{d}_{12}$ can be determined by analyzing the recorded images $I_1$ and $I_2$ since these images contain distinguishable features. FIG. 3 shows an exemplary representation of a feature 53 which is contained in both images $I_1$ and $I_2$. Since the features 53 contained in each of the images $I_1$ and $I_2$ correspond to a same feature on the object, the images $I_1$ and $I_2$ can be displaced relative to each other until the features 53 contained in both images coincide in a coordinate system containing both images.

Generally, a displacement $\vec{d}_{lm}$ between image $I_l$ and image $I_m$ can be calculated by correlating the two images. This displacement further determines a coordinate transformation which can be applied to elements in the coordinate system of the recorded first image $I_1$ in order to represent the same elements as locations in the coordinate system of the recorded second image $I_2$. A hatched portion in FIG. 3 represents the intersection of the bounding boxes of the recorded images $I_1$ and $I_2$.

A typical method to correlate two images is the phase correlation method in which, for two given images $I_l$ and $I_m$, the 2D Fourier transformations of the two images are calculated:

$$G_l = \mathcal{F}\{I_l\}, G_m = \mathcal{F}\{I_m\}$$

Then the cross-power spectrum is calculated:

$$R = \frac{G_l \cdot G_m^*}{|G_l \cdot G_m^*|}$$

The operator ∘ means Hadamard product (entry-wise product). The normalized cross correlation is obtained by inverse transformation of the cross-power spectrum:

$$r = \mathcal{F}^{-1}\{R\}$$

The normalized cross correlation r(x,y) contains a maximum point. The shift between two images can be obtained by locating the peak position in r:

$$\vec{d}_{lm} = (\Delta x, \Delta y) = \underset{(x,y)}{\operatorname{argmax}}\{r\}$$

The displacement can be further estimated with higher accuracy by interpolation around the maximum value, such that the displacement $\vec{d}_{lm}$ can take a non-integer value. Background information relating to non-integer positions in images can be obtained, for example, from Donald G. Bailey, Sub-pixel Estimation of Local Extrema, Image and Vision Computing NZ, Palmerston North, November 2003. A typical method is to use the centroid of the peak as the estimation of displacement. Assume that the maximum point of r is located at coordinate $(x_0, y_0)$, the centroid is calculated within a window of 2w+1 pixels around the maximum point:

$$\Delta x = \sum_{i=x_0-w}^{x_0+w} \sum_{j=y_0-w}^{y_0+w} x_i * r(x_i, y_j) \Big/ \sum_{i=x_0-w}^{x_0+w} \sum_{j=y_0-w}^{y_0+w} r(x_i, y_j)$$

$$\Delta y = \sum_{i=x_0-w}^{x_0+w} \sum_{j=y_0-w}^{y_0+w} y_j * r(x_i, y_j) \Big/ \sum_{i=x_0-w}^{x_0+w} \sum_{j=y_0-w}^{y_0+w} r(y_i, y_j)$$

Figure 4:
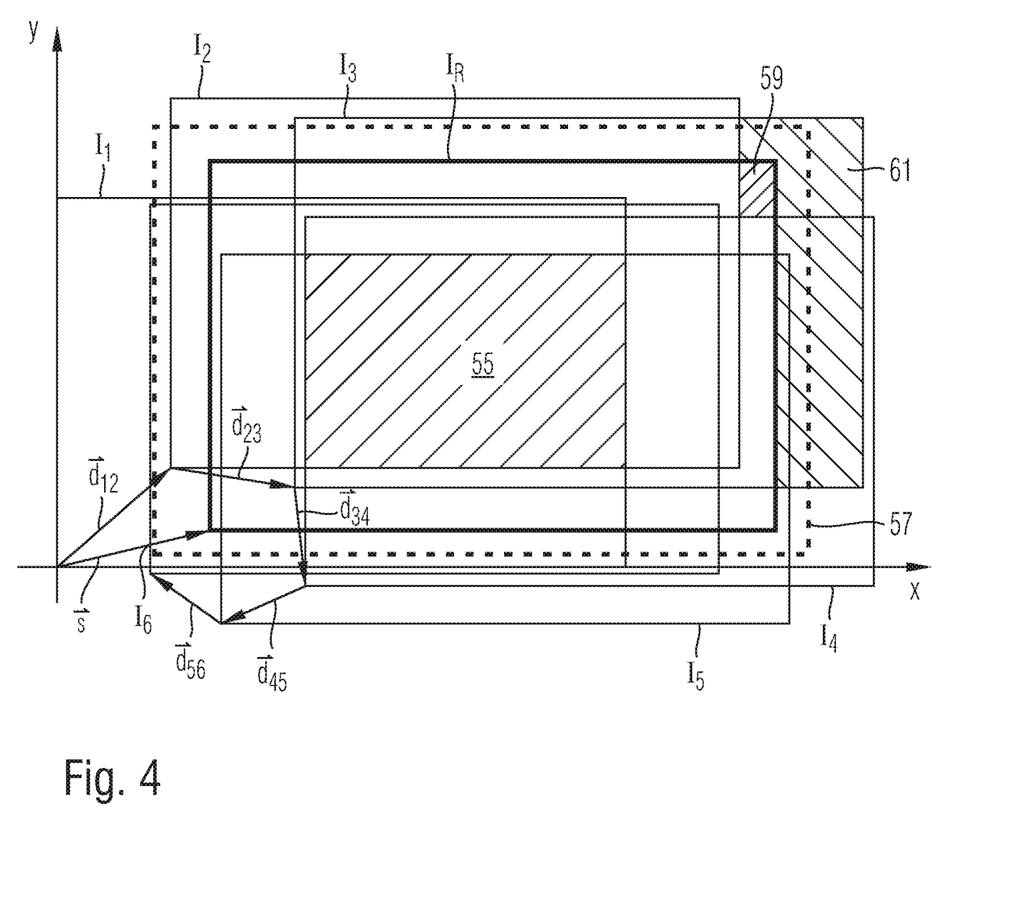
FIG. 4 is a schematic illustration of displacements of recorded images relative to each other and relative to a resulting image in the particle microscope shown in FIG. 1.

FIG. 4 shows a sequence of six recorded images $I_1$, $I_2, \ldots, I_6$. Each recorded image is displaced relative to the previous and the subsequent recorded images. The displacements between the images are indicated by $\vec{d}_{12}$, $\vec{d}_{23}$, $\vec{d}_{34}$, $\vec{d}_{45}$, $\vec{d}_{56}$. The displacements are determined by image analysis of the individual images. In the example of FIG. 4, the coordinate system of the first image $I_1$ is used as a common reference coordinate system.

The images $I_1, I_2, \ldots, I_6$ are combined to form a resulting image $I_R$. The images are combined in that sense that the image data of the individual image are combined to form image data of the resulting image $I_R$ having better signal to noise properties than the individual images. In the illustrated example, the image frame of the resulting image $I_R$ has a same size as the image frames of the recorded images $I_1$, $I_2, \ldots, I_6$.

A position of the resulting image $I_R$ relative to the recorded images is determined based on the displacements of the recorded images. In FIG. 4, $\vec{S}$ represents the displacement of the resulting image $I_R$ relative to the first image $I_1$. The displacement $\vec{S}$ can be determined using various algorithms involving the individual displacements $\vec{d}_{12}$, $d_{23}, \ldots \vec{d}_{56}$. According to an example, the displacement $\vec{S}$ is calculated as follows:

First, the locations of the second and subsequent images relative to the first image $I_1$ are calculated using the formula:

$$\vec{d}_l = \sum_{j=0}^{l} \vec{d}_{l,l+1},$$

wherein $\vec{d}_l$ represents the displacement of the l-th image relative to the first image.

Then, the displacement $\vec{S}$ of the resulting image $I_R$ is calculated according to the following formula:

$$\vec{S} = \sum_{l=0}^{L} \vec{a}_l \vec{d}_l.$$

Herein, $a_i$ represents a weighting factor associated with each image. If the weighting factors $a_i$ are all the same, the above formula determines $\vec{S}$ such that the resulting image $I_R$ can be understood such that its image center coincides with a center of gravity of the image centers of the recorded images. According to other examples, the weighting factors can be selected differently. For example, a weighting factor associated with a recorded image located farther away from the resulting image may have a lower value than a weighting factor associated with a recorded image located closer to the resulting image. According to another example, weighting factors associated with images having higher displacements relative to their preceding and/or subsequent images are lower than weighting factors associated with images having smaller displacements relative to their preceding and/or subsequent images, respectively.

After the image frame or bounding box of the resulting image $I_R$ has been determined based on the displacements between the recorded images, the image data of the resulting image can be calculated based on the intensity values of the image data of the recorded images associated with those locations which are located within the determined bounding box associated with the resulting image $I_R$. For example, the following formula can be used for calculating the image intensities associated with locations within the resulting image:

$P(x,y) = \sum_{i=1}^{N(x,y)} W_i P_i(x,y) / N(x,y) \sum_{i=1}^{N(x,y)} W_i$, if $N(x,y) > 0$ and $P(x,y) = I_0$, if $N(x,y) = 0$ wherein:
$P_i(x,y)$ is the intensity value of the i-th image represented in the coordinate system of the final image. As the displacement vector can take a non-integer value, the $P_i(x,y)$ value is obtained by interpolating the intensity values obtained in the i-th image. An interpolation method such as multivariate interpolation can be used for this purpose.
$W_i$ represents weighting factors.
$N(x,y)$ represents the number of recorded images contributing to coordinate (x,y), wherein $N(x,y)$ can have values ranging from 0 to the total number of recorded images.

$I_0$ is a predefined value used for padding at those locations where none of the recorded images contributes to coordinate (x,y).

The weighting factors $W_i$ can be the same for all values of i. It is, however, also possible to set the values of the weighting factors according to a different strategy. For example, the weighting factors can be calculated as follows:

$$W_i = \frac{1}{\pi s \left[ 1 + \left( \frac{d_i}{s} \right)^2 \right]}$$

wherein $\vec{d}_i$ is the displacement of the i-th image relative to the resulting image, and s is a suitably selected controlling parameter.

Weighting factors determined according to this formula assign a higher weight to images closer to the resulting image than to images farther away from the resulting image.

A hatched portion 55 in FIG. 4 represents the intersection of the bounding boxes of all recorded images $I_1, I_2, \ldots, I_6$. The bounding boxes of all recorded images $I_1, I_2, \ldots, I_6$ have a same size in this particular example. However, this is not a requirement, and the recorded images may have bounding boxes of different sizes.

Moreover, the size of the bounding box of the resulting image is equal to the size of the bounding boxes of the recorded images in this particular examples. Again, this is not a requirement, and the size of the bounding box of the resulting image can be different from the sizes of the bounding boxes of any of the recorded images as long as the size of the bounding box of the resulting image is greater than the intersection of the bounding boxes of all recorded images $I_1, I_2, \ldots, I_6$. A broken line 57 in FIG. 4 illustrates a bounding box of a possible resulting image which is greater than the bounding boxes of the recorded images. A hatched portion 59 in FIG. 4 illustrates a portion of the resulting image $I_R$ containing image data originating from only one recorded image $I_3$. Moreover, a hatched portion 61 in FIG. 4 indicates a portion of recorded image $I_3$ containing intensity values which do not contribute to the image data of the resulting image.

In processes of recording of an image as illustrated above, each of the plural recorded images is stored in a memory and the image data of the resulting image are calculated after the recording of all of the plural recorded images has been completed. Such method invovles an amount of available memory corresponding to the number of the recorded images.

According to an alternative method, a limited number of subsequently recorded images is stored in a first-in-first-out (FIFO) queue. Each newly recorded image is added to the queue while the oldest image stored in the queue is removed from the queue. A resulting image can be calculated from the recorded images currently stored in the queue at each instance of time according to the principles illustrated above.

According to a still further method, a memory for the resulting image is provided during the recording of the recorded images. When the recording of each recorded image is completed, the information of the newly recorded image is added to the resulting image, wherein the weight of the newly recorded image relative to the resulting image is determined based on the number of the recorded images which have been added to the resulting image before. For example, the weight of the newly recorded image can be 1, while the weight of the resulting image can be N, wherein N is the number of the recorded images which have already been added to the resulting image. In such method, the amount of memory allocated to the resulting image is advantageously selected sufficiently large in order to accommodate resulting images which are greater than the individual recorded images such that all recorded images experiencing a reasonable amount of displacements relative to their preceding images can be added to the resulting image without truncation.

What is claimed is:

1. A method, comprising:
recording plural images of an object using a particle microscope, wherein each of the recorded images is associated with image data, wherein the image data include a plurality of intensity values associated with locations in a coordinate system of the recorded image, wherein the locations are located within a bounding box of the recorded image;
determining displacements between the coordinate systems of the image data of the recorded images by correlating the image data of the recorded images;
determining a displaced bounding box of a resulting image based on the determined displacements, wherein the displaced bounding box has a size which is greater than an intersection of the bounding boxes of all the recorded images determined based on the determined displacements; and
calculating image data of the resulting image based on the intensity values of the image data of the recorded images associated with those locations which are located within the determined displaced bounding box associated with the resulting image based on the determined displacements of the recorded images,
wherein:
a number of the recorded images contributing to the calculated image data of the resulting image within the intersection of the bounding boxes of all the recorded images is equal to a number of the recorded images; and
a number of the recorded images contributing to the calculated image data of the resulting image outside of the intersection of the bounding boxes of all the recorded images is less than the number of the recorded images.

2. The method according to claim 1, wherein calculating the image data of the resulting image comprises selecting intensity values from the image data of each of the recorded images, wherein the selected intensity values are associated with locations in the recorded images which are located, after applying a coordinate transformation from the coordinate system of the recorded image to the coordinate system of the resulting image, within the displaced bounding box of the resulting image.

3. The method according to claim 2, wherein intensity values of the recorded images which have not been selected do not contribute to the calculating of the image data of the resulting image.

4. The method according to claim 2, further comprising selecting of all image data of the recorded images which are located within the displaced bounding box of the resulting image.

5. The method according to claim 3, further comprising selecting of all image data of the recorded images which are located within the displaced bounding box of the resulting image.

6. The method according to claim 1, further comprising determining a displacement of the coordinate system of the image data of each of the recorded images relative to the coordinate system of the image data of the resulting image.

7. The method according to claim 6, wherein the displaced bounding box of the resulting image is determined such that a weighted sum of the determined displacements of the coordinate systems of the image data of the recorded images relative to the coordinate system of the image data of the resulting image is less than or equal to a predetermined amount.

8. The method according to claim 7, wherein all weights in the weighted sum of the determined displacements are equal.

9. The method according to claim 7, wherein the weights of a first group of the determined displacements in the weighted sum of the determined displacements are each greater than any of the weights of a second group of the determined displacements in the weighted sum of the determined displacements, wherein each of the determined displacements of the first group are all smaller than any of the determined displacements of the second group.

10. The method according to claim 1, wherein the calculating of the image data of the resulting image includes calculating intensity values associated with given locations in the coordinate system of the resulting image, and
wherein the calculating of the intensity value associated with the given location in the coordinate system of the resulting image includes calculating a weighted sum of intensity values of the recorded images located, after applying coordinate transformations from the coordinate system of the recorded images to the coordinate system of the resulting image, at a distance from the given location which is smaller than or equal to a threshold distance.

11. The method according to claim 10, wherein weights of the intensity values in the weighted sum of the intensity values of the recorded images depend on the distance.

12. The method according to claim 11, wherein weights of the intensity values in the weighted sum of the intensity values of the recorded images depend on displacements of the coordinate systems of the image data of the recorded images relative to the coordinate system of the image data of the resulting image.

13. The method according to claim 10, wherein weights of the intensity values in the weighted sum of the intensity values of the recorded images depend on displacements of the coordinate systems of the image data of the recorded images relative to the coordinate system of the image data of the resulting image.

14. The method according to claim 1, further comprising generating an image data file based on the image data of the resulting image and outputting the generated image data file.

15. The method according to claim 14, wherein calculating the image data of the resulting image comprises selecting intensity values from the image data of each of the recorded images, wherein the selected intensity values are associated with locations in the recorded images which are located, after applying a coordinate transformation from the coordinate system of the recorded image to the coordinate system of the resulting image, within the displaced bounding box of the resulting image.

16. The method according to claim 1, further comprising displaying a representation of the image data of the resulting image on a display screen.

17. The method according to claim 16, further comprising determining a displacement of the coordinate system of the image data of each of the recorded images relative to the coordinate system of the image data of the resulting image.

18. One or more machine-readable hardware storage devices comprising instructions that are executable by one or more processing devices to perform operations comprising:
  recording plural images of an object using a particle microscope, wherein each of the recorded images is associated with image data, wherein the image data include a plurality of intensity values associated with locations in a coordinate system of the recorded image, wherein the locations are located within a bounding box of the recorded image;
  determining displacements between the coordinate systems of the image data of the recorded images by correlating the image data of the recorded images;
  determining a displaced bounding box of a resulting image based on the determined displacements, wherein the displaced bounding box has a size which is greater than an intersection of the bounding boxes of all the recorded images determined based on the determined displacements; and
  calculating image data of the resulting image based on the intensity values of the image data of the recorded images associated with those locations which are located within the determined displaced bounding box associated with the resulting image based on the determined displacements of the recorded images,
  wherein:
    a number of the recorded images contributing to the calculated image data of the resulting image within the intersection of the bounding boxes of all the recorded images is equal to a number of the recorded images; and
    a number of the recorded images contributing to the calculated image data of the resulting image outside of the intersection of the bounding boxes of all the recorded images is less than the number of the recorded images.

19. A system, comprising:
  one or more processing devices; and
  one or more machine-readable hardware storage devices comprising instructions that are executable by the one or more processing devices to perform operations comprising:
    recording plural images of an object using a particle microscope, wherein each of the recorded images is associated with image data, wherein the image data include a plurality of intensity values associated with locations in a coordinate system of the recorded image, wherein the locations are located within a bounding box of the recorded image;
    determining displacements between the coordinate systems of the image data of the recorded images by correlating the image data of the recorded images;
    determining a displaced bounding box of a resulting image based on the determined displacements, wherein the displaced bounding box has a size which is greater than an intersection of the bounding boxes of all the recorded images determined based on the determined displacements; and
    calculating image data of the resulting image based on the intensity values of the image data of the recorded images associated with those locations which are located within the determined displaced bounding box associated with the resulting image based on the determined displacements of the recorded images,
  wherein:
    a number of the recorded images contributing to the calculated image data of the resulting image within the intersection of the bounding boxes of all the recorded images is equal to a number of the recorded images; and
    a number of the recorded images contributing to the calculated image data of the resulting image outside of the intersection of the bounding boxes of all the recorded images is less than the number of the recorded images.

20. The system of claim 19, further comprising the particle microscope.

* * * * *

UNITED STATES PATENT AND TRADEMARK OFFICE
CERTIFICATE OF CORRECTION

PATENT NO. : 10,839,491 B2
APPLICATION NO. : 16/035887
DATED : November 17, 2020
INVENTOR(S) : Luyang Han, Andreas Schmaunz and Martin Edelmann Page 1 of 1

It is certified that error appears in the above-identified patent and that said Letters Patent is hereby corrected as shown below:

In the Specification

Column 8, Line 20 (Approx.), delete "$\vec{d}_{lm} = (\Delta x, \Delta y) = \operatorname*{argmax}_{(x,y)}\{r\}$" and insert -- $\vec{d}_{lm} = (\Delta x, \Delta y) = \operatorname*{arg\,max}_{(x,y)}\{r\}$ --;

Column 9, Line 2, delete "d₂₃," and insert -- $\vec{d}_{23}$ --;

Column 9, Line 20 (Approx.), delete "$\vec{S} = \sum_{l=0}^{L} \vec{a}_l \vec{d}_l$" and insert -- $\vec{S} = \sum_{l=0}^{L} a_l \vec{d}_l$ --;

Column 10, Line 16 (Approx.), delete "$\vec{d}_i$" and insert -- $d_i$ --;

Column 10, Line 49, delete "invovles" and insert -- involves --.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*